(12) United States Patent
Gilles

(10) Patent No.: US 6,253,656 B1
(45) Date of Patent: Jul. 3, 2001

(54) SENSOR ASSEMBLY FOR A BRAKE BOOSTER AND BRAKE BOOSTER EQUIPPED THEREWITH

(75) Inventor: Leo Gilles, Koblenz (DE)

(73) Assignee: Lucas Industries Public Limited Company (GB)

( * ) Notice: Subject to any disclaimer, the term of this patent is extended or adjusted under 35 U.S.C. 154(b) by 0 days.

(21) Appl. No.: 09/477,994

(22) Filed: Jan. 5, 2000

Related U.S. Application Data
(60) Provisional application No. PCT/EP98/04250, filed on Jul. 8, 1998.

(51) Int. Cl.[7] ................................................ B60T 13/68
(52) U.S. Cl. ................................................................ 91/367
(58) Field of Search ........................... 91/361, 367, 368, 91/374, 376 R, 385

(56) References Cited

U.S. PATENT DOCUMENTS

| | | | |
|---|---|---|---|
| 4,756,231 | * 7/1988 | Kobayashi et al. | 91/369.2 |
| 5,158,343 | 10/1992 | Reichelt et al. | |
| 5,226,347 | * 7/1993 | Gautier et al. | 91/369.2 |
| 5,526,729 | * 6/1996 | Ando et al. | 91/376 R X |
| 5,704,694 | * 1/1998 | Kozakai | 91/376 R X |
| 5,711,204 | 1/1998 | Michels | 91/376 R |
| 5,725,291 | * 3/1998 | Michels | 303/125 |

FOREIGN PATENT DOCUMENTS

| | | |
|---|---|---|
| 4028290 C1 | 9/1990 | (DE) . |
| 4436297 A1 | 4/1996 | (DE) . |
| 306721 B1 | 9/1991 | (EP) . |
| 706924 A1 | 4/1996 | (EP) . |

OTHER PUBLICATIONS

Article entitled "Neue Verfahren und Produkte fur die Praxis" by Prof. Dr.–Ing. K. W. Bonfig, Prof. Dr.–Ing. Wilfried J. Bartz, Dipl.–Ing. J. Wolff, published in "Das Handbusch Fur Ingenieure", Apr. 1988 at pp. 186–187.

* cited by examiner

Primary Examiner—John E. Ryznic
(74) Attorney, Agent, or Firm—MacMillan, Sobanski & Todd, LLC

(57) ABSTRACT

A sensor assembly for a vacuum brake booster (10) comprises a housing (48) arranged outside the brake booster housing (12), in which a differential pressure sensor (56) is located. For connecting the differential pressure sensor (56) with a working chamber (16') of the brake booster (10), the housing (48) has a first air duct (50) which extends from the sensor assembly (46) to the working chamber (16') of the brake booster (10). In addition, the sensor assembly (46) has a second air duct (52) which extends into a vacuum chamber (18') of the brake booster (10) in order to connect the differential pressure sensor (56) with said vacuum chamber (18'). A plug-type or socket-type connector (64) for a further sensor is provided in particular on the side of the sensor assembly (46) which is opposite the air ducts (50, 52).

15 Claims, 4 Drawing Sheets

SENSOR ASSEMBLY FOR A BRAKE BOOSTER AND BRAKE BOOSTER EQUIPPED THEREWITH

CROSS REFERENCE TO RELATED APPLICATIONS

This application is a continuation of International Application No. PCT/EP98/04250 filed Jul. 8, 1998, which claims priority to German Patent Application No. 19729158.9 filed Jul. 8, 1997.

BACKGROUND OF THE INVENTION

The invention relates to a sensor assembly for a vacuum brake booster which is in particular adapted to be actuated electromagnetically, and to a vacuum brake booster which is equipped with such a sensor assembly.

Vacuum brake boosters with an electromagnetic al actuation unit are known, for example, from DE 40 28 290 C1. Brake boosters of the mentioned type are equipped with an electromagnetic actuation unit in order to, additionally or alternatively to the normal, leg force-proportional actuation by the driver of a vehicle, actuate the vehicle brake system by controlling the brake booster. In this manner, on the one hand, fully automatic braking operations, i.e. braking operations without any intervention by the driver, can be realized and, on the other hand, a braking operation initiated by the driver can be assisted, which is of advantage in certain situations, e.g. in an emergency braking operation in order to prevent a collision. Investigations have shown that the majority of the drivers do not press the brake pedal sufficiently vigorously in critical situations so that the braking distance is unnecessarily prolonged. In such a case, the mentioned electromagnetic actuation unit provides the possibility e.g. to fully activate the brake booster independent from the leg activation force of the driver and thus provide the maximum possible brake boost (so-called braking assistant). Solutions of this kind are already employed in production vehicles.

For the detection whether a braking operation is an emergency braking and consequently when the electromagnetic actuation unit of the brake booster is to be activated, as well as for the realisation of completely automatic braking operations, for example in cooperation with a vehicle-to-vehicle distance control system, it is necessary to know the currently prevailing pressure conditions in the brake booster, which are, as a rule, provided to an electronic controller which processes certain parameters of the brake booster and/or a master cylinder connected therewith in order to control the electromagnetic actuation unit in the desired manner. Such a controller is generally arranged remote from the brake booster and is in electrical connection with the latter via electrical lines and is possibly in fluid connection therewith via hoses or tubes. EP 0 306 721 B1 proposes to accommodate the controller in the housing of the brake booster. Such a solution, however, requires a specially designed brake booster housing and therefore opposes an efficient series production of different brake boosters.

The knowledge of the currently prevailing pressure conditions in a vacuum brake booster can also be desired for other reasons, even with a vacuum brake booster which cannot be actuated electromagnetically.

SUMMARY OF THE INVENTION

The invention is based on the object to provide a sensor assembly for a vacuum brake booster the constructive design of which is as compact as possible and the functional and electrical connection of which to a vacuum brake booster is facilitated.

According to the invention, this object is solved by a sensor assembly having the features specified in claim 1. The sensor assembly according to the invention is characterised in that the entire sensor system and sensor connection technique, which is required for the determination of the pressure conditions currently prevailing in the brake booster, is integrated in the sensor assembly so that the sensor assembly can be flange-mounted directly to the brake booster most easily. The direct flange-mounting of the sensor assembly according to the invention is not only easy to install and in addition space-saving but also results in short connection paths of the electrical lines and the fluid connections which are thus unsusceptible to failure. The sensor assembly according to the invention, when connected to a controller which may be integrated in the sensor assembly, is capable of determining the pressure difference currently prevailing at the or at one of the walls of the brake booster by means of its differential pressure sensor and the two air ducts and establishing the currently effective brake boost therefrom.

In a preferred embodiment of the sensor assembly according to the invention both air ducts are rigid. In such an embodiment the sensor assembly is connected both functionally and mechanically with the brake booster by means of the two air ducts.

The first and/or the second air ducts are advantageously integrally formed with the housing of the sensor assembly so that the entire pre-assembled sensor assembly can be connected with the brake booster in one operation. The mentioned integral configuration can be achieved particularly well if the housing of the sensor assembly is a plastic injection moulded part at which the air ducts are integrally formed.

Preferably, retaining arms for the differential pressure sensor are provided in the housing of the sensor assembly, which according to an configuration advantageous in terms of manufacture are integrally formed with the housing and/or the air ducts. During the installation, the differential pressure sensor locks with the retaining arms so that it is securely held in the locks with of the sensor assembly without requiring further adjusting operations.

According to one embodiment of the sensor assembly according to the invention the two air ducts are arranged one inside the other. For example, the second air duct coaxially surrounds the first air duct. This embodiment is space saving and requires only one single passage in the brake booster housing for both air ducts.

The air ducts are preferably adapted to be locked with the brake booster housing by means of a locking projection, in particular a circumferential one. This enables a simple and secure installation of the sensor assembly at the brake booster, since the air ducts are simply inserted into the brake booster housing until they come into locking engagement, which also secures the sensor assembly itself.

The first air duct which extends as far as into the working chamber of the brake booster is preferably provided, in its end section facing the working chamber, with openings penetrating the duct wall, which provide for a fluid connection of the working chamber with the first air duct. This configuration makes it possible to continue the first air duct e.g. by means of an elastomeric bellows through the brake booster housing so that the first air duct, besides its primary purpose of providing a fluid connection between the working chamber of the brake booster and the differential pressure sensor in the sensor assembly, can also accommodate electrical lines which in this manner can be routed in a space-saving way from the sensor assembly or the controller, respectively, through the brake booster to the electromagnetic actuation unit. Advantageously, the first air duct is dimensioned such that it provides space for the mentioned electrical connecting lines.

According to a further embodiment of the sensor assembly according to the invention, a plug-type or socket-type connector for a further sensor is provided at the housing of same. In this manner, for example, a hydraulic pressure sensor can be connected easily, which supplies the hydraulic pressure in at least one brake circuit of a hydraulic vehicle brake system as a further parameter to the controller. It is thereby possible to improve the activation behaviour of an electronically controlled brake booster and to achieve a more comfortable operational performance.

In a brake booster equipped with the sensor assembly according to the invention, the sensor assembly is preferably secured to the brake booster by means of one or several locking projections which are circumferentially formed on the outer surface of the second air duct (with a coaxial arrangement of the two air ducts) or on the outer surface of both air ducts, these locking projections being sealingly locked behind rubber sleeves inside the brake booster housing. The rubber sleeves are fitted in those passages in the brake booster housing wall, which must be provided for the passage of the air duct(s).

In an advantageous embodiment of such a brake booster equipped with the sensor assembly according to the invention, the sensor assembly is connected at its plug-type or socket-type connector to a pressure sensor, said pressure sensor comprising a V-shaped angled sensor housing. The free end of the one leg of the V-shaped sensor housing is designed as a connector corresponding to the plug-type or socket-type connector of the sensor assembly, while the free end of the other leg of the V-shaped sensor housing comprises a connector for fluid connection with the master cylinder. With such a configuration, the hydraulic pressure sensor can be pre-assembled at the master cylinder housing and, upon joining the master cylinder and the brake booster, the electrical connector of the hydraulic pressure sensor automatically locks with the plug-type or socket-type connector of the sensor assembly already assembled to the brake booster. The electrical connection of the pressure sensor with the sensor assembly made in this manner can be disconnected only, if the master cylinder and the brake booster are released again so that an unintentional disconnection of the mentioned connection is reliably prevented.

Several embodiments of an sensor assembly according to the invention and a brake booster equipped with same will be explained in detail in the following with reference to the figures, in which

BRIEF DESCRIPTION OF THE DRAWINGS

FIG. 1 illustrates an embodiment of an electronically controlled vacuum brake booster 10 together with a flange-mounted master cylinder 11 for a hydraulic brake system of a motor vehicle in an overall layout. In the illustrated example the brake booster 10 is designed as a so-called tandem brake booster, i.e. its essentially rotationally symmetrical housing 12 comprises two movable walls 14, 14' which divide the interior space of the brake booster housing 12 into two working chambers 16, 16' and two vacuum chambers 18, 18' each. The two vacuum chambers 18, 18' are permanently connected with a vacuum source which is not shown herein, for example with the intake system of a combustion engine, while the two working chambers 16, 16' can be connected optionally to vacuum or at least atmospheric pressure by a control valve 20 having a housing 22.

Figure 1:
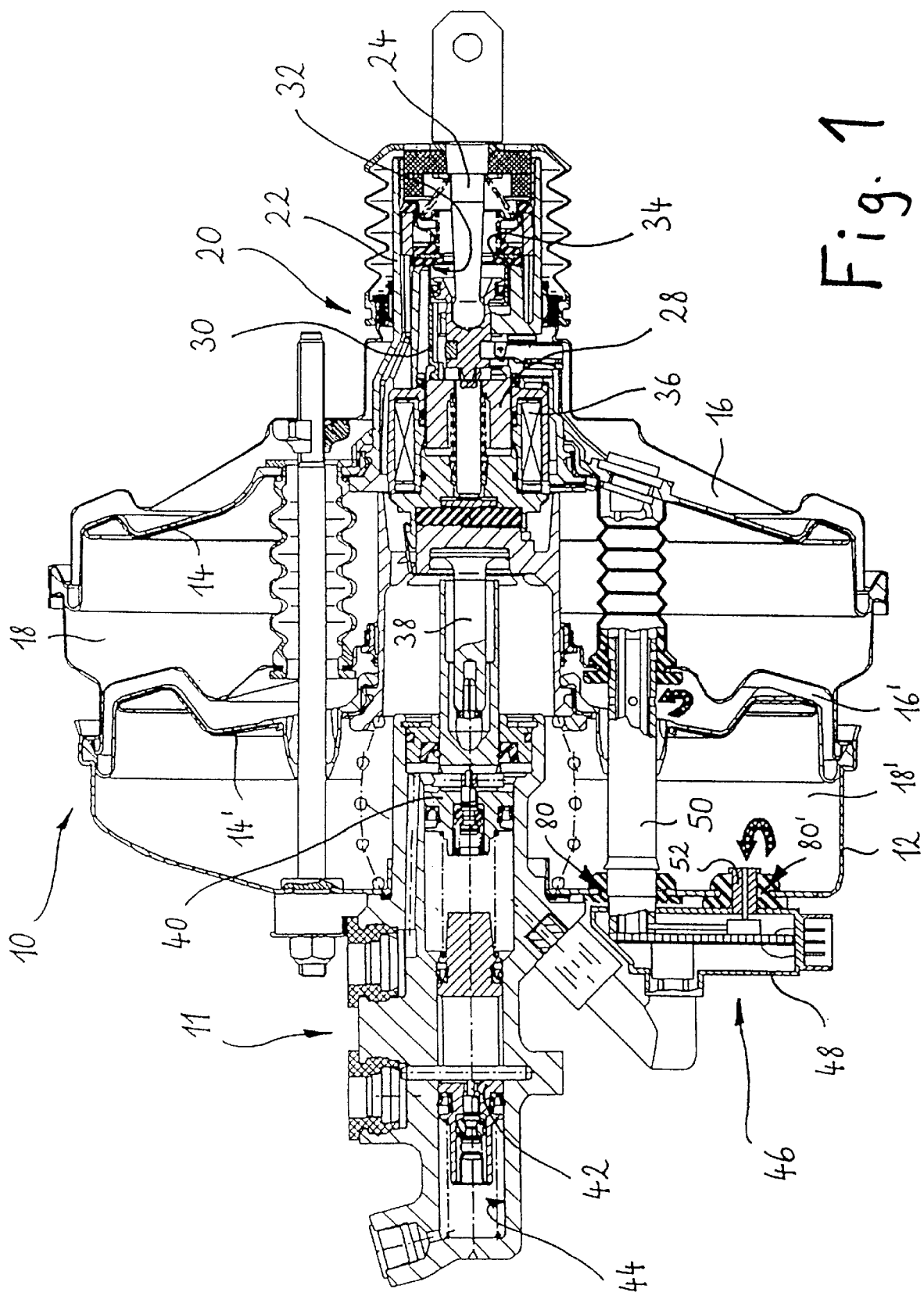
FIG. 1 shows a longitudinal section through a vacuum brake booster equipped with a sensor assembly according to invention, which is flange-coupled to a master cylinder.

The control valve 20 can be actuated either directly by the vehicle driver by introducing his leg force into the control valve 20, for example, via a brake pedal which is not shown herein and which is coupled with a force input rod 24, or it can be actuated independent of the leg force by means of an electromagnetic actuation unit 26. For this purpose the electromagnetic actuation unit 26 has an essentially hollow cylindrical magnet armature 28 which, on its right side in FIG. 1, is rigidly coupled with a sleeve 30 at the right end (FIG. 1) of which a first circular valve seat 32 is formed which sealingly cooperates with an elastic sealing element 34. Depending on the degree of excitation of a solenoid coil 36 of the electromagnetic actuation unit 26, the magnet armature 28 moves by a larger or smaller distance to the left, relative to FIG. 1, and thereby lifts the first valve seat 32 off the sealing element 34 so that a controlled supply of atmospheric pressure to the working chamber 16 is enabled.

If the working chambers 16, 16' are connected to atmospheric pressure (or to above atmospheric pressure) by the function of the control valve 20, the two movable walls 14, 14' move to the left relative to FIG. 1 due to the pressure difference building up at said walls and thereby apply a force to the control valve housing 22 which transmits this force via a reaction piston 38 into the master cylinder 11 which is arranged functionally downstream the brake booster 10, whereby, as a result, a corresponding brake pressure is then built up in the master cylinder 11 by the displacement of a primary piston 40 and a secondary piston 42 which are arranged in a bore 44 of the master cylinder housing. This is the usual function of the brake booster 10 with its control valve 20 and the master cylinder 11 connected therewith, as it is generally known to those with skill in the art so that no further explanation is required.

For the purpose of controlling the electromagnetic actuation unit 26, said unit is connected with a sensor assembly 46 via an electronic controller. According to FIG. 1 and FIG. 2 the electronic controller is integrated in the sensor assembly 46 and is capable of actuating the control valve 20 and thus the brake booster 10 as a function of signals from the sensor assembly 46 completely independent of any leg force or also in a manner in which the driver's leg force is assisted. It is therefore possible to realise also automatic vehicle braking operations with such an assembly.

Figure 2:
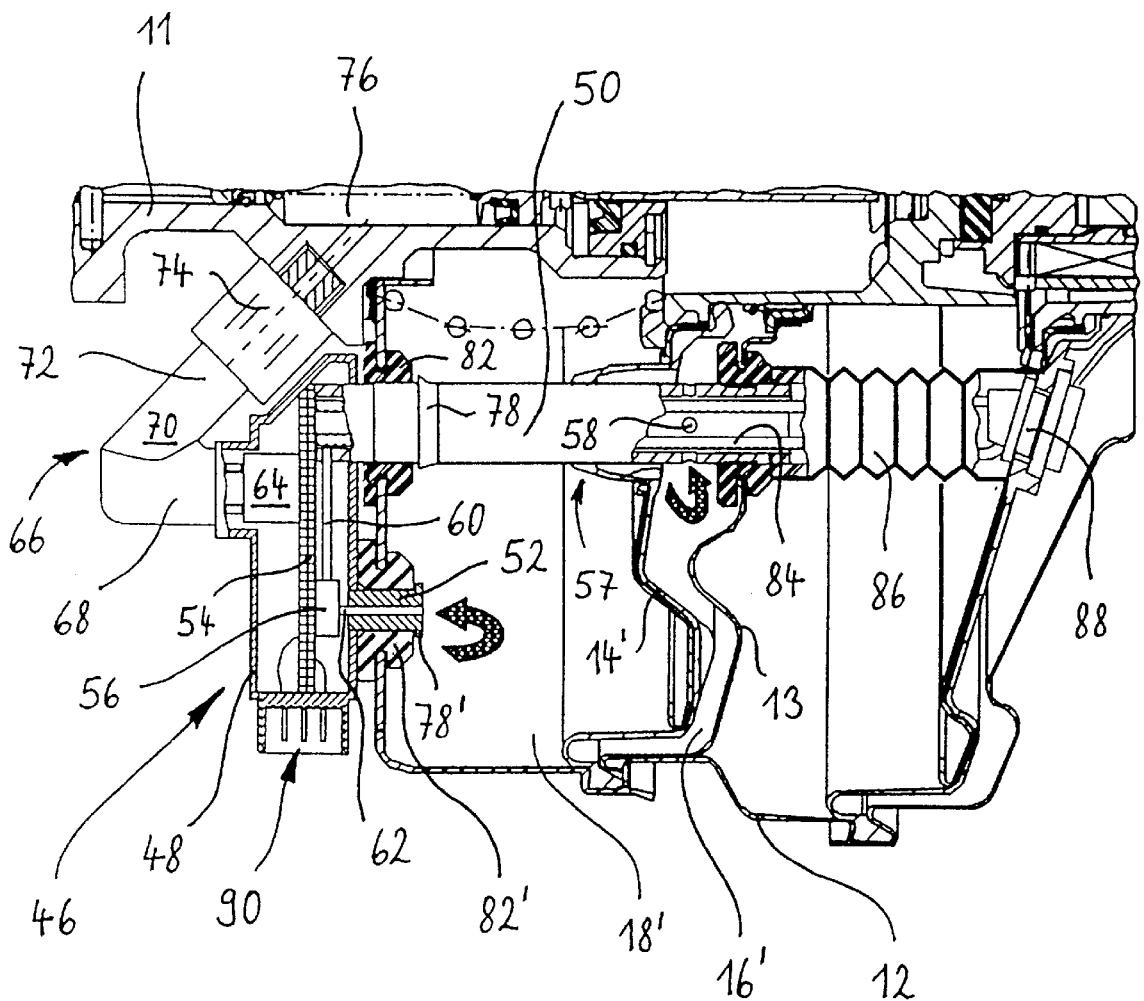
FIG. 2 shows the area of FIG. 1 concerning the sensor assembly in an enlarged presentation.

The sensor assembly 46 which can better be seen in FIG. 2 has a housing 48 made by plastic injection moulding at which are integrally formed a first tubular air duct 50 and a second air duct 52, which is also tubular and is spaced from and extends parallel to said first duct. The material of the two air ducts 50, 52 is selected such that they are both essentially rigid. The first air duct 50 extends from the sensor assembly 46 which is located outside the brake booster housing 12 into the brake booster housing 12 as far as into the working chamber 16'. The second air duct 52 also extends from the sensor assembly 46 into the interior of the brake booster housing 12, wherein, however, the second air duct 52 terminates already in the vacuum chamber 18' which cooperates with the working chamber 16'.

DETAILED DESCRIPTION OF THE INVENTION

A differential pressure sensor 56 is mounted on an electronic board 54 in the housing 48 of the sensor assembly 46. The first air duct 50 provides a fluid connection between the working chamber 16' and the differential pressure sensor 56 via radial openings 58 located in its end section facing the working chamber and a small connecting tube 60 which is arranged in the housing 48. The movable wall 14' through which the first air duct 50 extends is sealed at 57 on the outer surface of the first air duct 50 (see FIG. 2) and can slide along the first air duct 50. Correspondingly, the second air duct 52 provides a fluid connection between the vacuum chamber 18' and the differential pressure sensor 56 in the sensor assembly 46 via its end side opening in the vacuum chamber 18' and a small connecting tube 62. The sensor assembly 46 is thus capable of sensing the differential pressure currently prevailing at the movable wall 14' and calculate therefrom the currently effective brake boost by means of the controller (not shown) which, for example, can be provided as a chip on the electronic board 54.

Additionally, in the illustrated embodiment, the hydraulic pressure which is currently prevailing in the primary brake circuit of the master cylinder 11 is supplied as a further parameter to the sensor assembly 46. For this purpose, the sensor assembly 46, at its side opposite the two air ducts 50 and 52, comprises a socket-type electrical connector 64 into which a correspondingly plug-type designed connector of a hydraulic pressure sensor 66 is locked which is located at the free end of the one leg 68 of a V-shaped housing 70 of the hydraulic pressure sensor 66. At the free end of the other leg 72 of the housing 70, the hydraulic pressure sensor 66 comprises a connector 74 for pressure-tight fluid connection with the pressure chamber 76 of the primary brake circuit, which contains hydraulic fluid. The hydraulic fluid in the pressure chamber 76 is pressurised by the primary piston 40 upon an actuation of the brake booster 10.

The hydraulic pressure sensor 66 senses the fluid pressure prevailing in the pressure chamber 76 and converts it into a corresponding electrical signal which is supplied to the sensor assembly 46 via the connector 64. In this manner, the microcomputer which is included in the sensor assembly 46 can control the boost rate of the brake booster 10 as a function of the prevailing hydraulic pressure and thus ensure a response and operating behavior of the entire brake booster/master cylinder unit, which is experienced as comfortable.

For attaching the sensor assembly 46 at the brake booster 10 the air ducts 50, 52 comprise one circumferential locking projection 78, 78' each in an area which, with the sensor assembly 46 installed, is located inside the brake booster housing 12. In this manner, the sensor assembly 46 can be secured at the brake booster 10 by simply inserting it into two passages 80 and 80' which are provided in the wall of the brake booster housing 12. For a pressure-tight sealing of the passages 80, 80', one annular rubber sleeve 82, 82' each is fitted in the passages 80 or 80', respectively, through which the associated air duct 50 or 52 is routed. Due to the fact that the outer diameter of the air duct 50 or 52, respectively, is larger than the diameter of the corresponding opening in the rubber sleeves 82, 82', each rubber sleeve 82, 82' provides a reliable seal both against the air duct as well as against the wall of the brake booster housing 12. The locking projections 78, 78' are designed such that they can be pushed through the associated rubber sleeve 82, 82' in the direction of insertion and to be then locked behind same so that the sensor assembly 46 can not be separated from the brake booster housing 12 without destroying the rubber sleeves 82, 82'. Consequently, the sensor assembly 46 is connected with the brake booster 10 both mechanically and functionally by the two air ducts 50 and 52.

In the illustrated embodiment, the first air duct 50 does not only provide a fluid connection between the sensor assembly 46 and the working chamber 16', but it also has the function of accommodating electrical connecting lines 84 which lead from the sensor assembly 46 or the controller, respectively, housed therein to the electromagnetic actuation unit 26 of the brake booster 10. For this purpose, the first air duct 50 is extended by an elastomeric bellows 86 the left end of which (in the figures) is sealingly attached both on the air duct 50 and opposite an intermediate wall 13 of the brake booster housing 12, and the opposite other end of which is sealingly attached at the movable wall 14 of the brake booster 10. A plug 88 of elastomeric material fitted into the movable wall 14 seals the first air duct end side, tightly surrounds the connecting lines 84, and guides them out of the first air duct 50. The diameter of the first air duct 50 is selected large enough so that the reduction of the free cross section caused by the connecting lines 84 in its interior does not obstruct the gas exchange through the air duct 50.

With respect to joining the brake booster 10 and the master cylinder 11, the V-shaped housing 70 of the hydraulic pressure sensor 66 is advantageous in that the hydraulic pressure sensor 66 can be attached to the master cylinder 11 via its connector 74 already prior to said joining and that, upon joining the master cylinder 11 and the brake booster 10, the electrical connection of the sensor 66 easily locks with the socket-type connector 64 of the sensor assembly 46. In the joined state of the brake booster 10 and the master cylinder 11 the V-shaped housing 70 has the additional advantage that the electrical connector of the hydraulic pressure sensor 66 at the sensor assembly 46 cannot be released unintentionally.

For the electrical connection of the sensor assembly 46 with the remaining vehicle electrical and electronic systems, a central plug 90 is provided at the bottom of the housing 48 of the sensor assembly 46.

Figure 3:
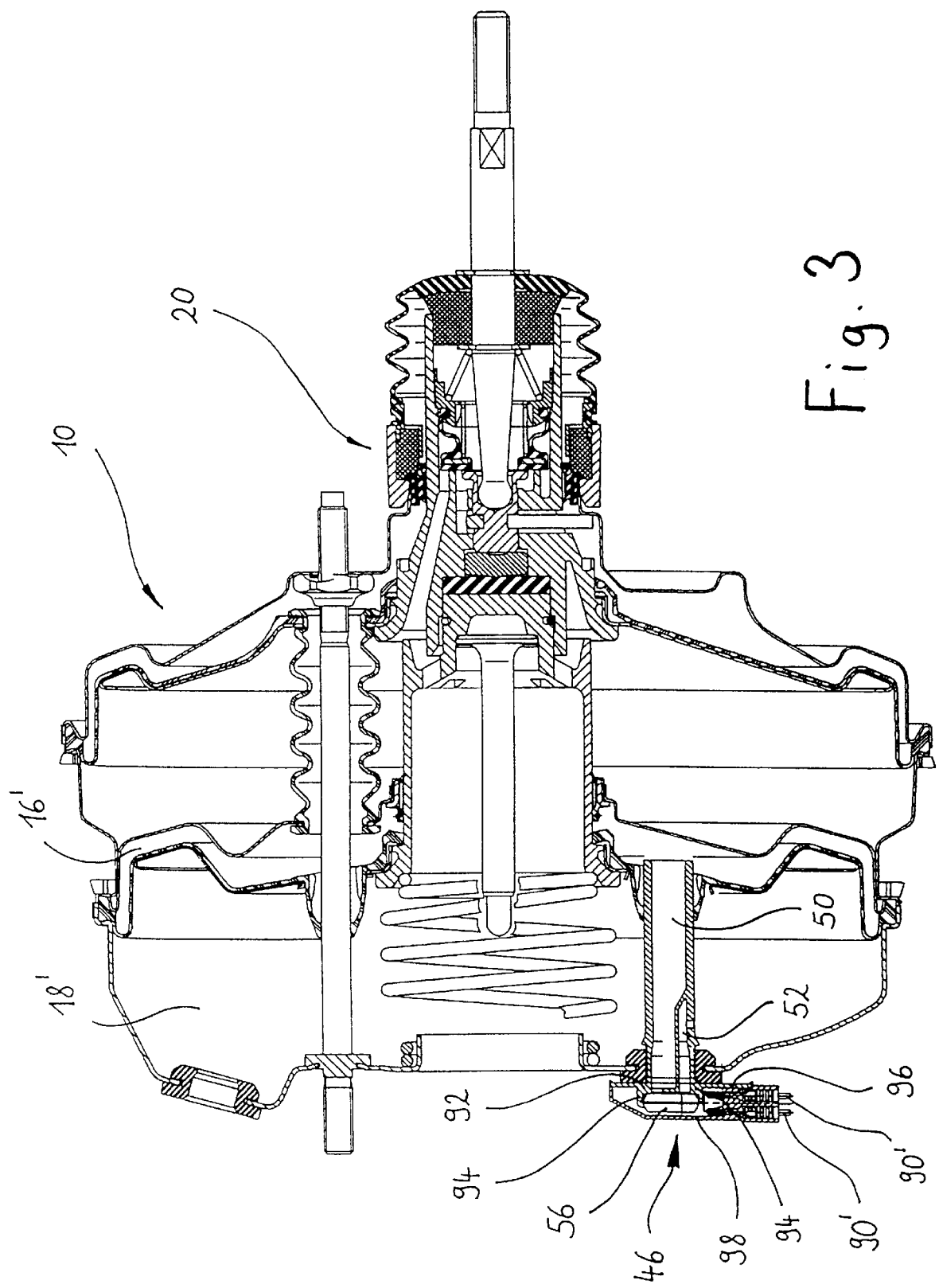
FIG. 3 shows a longitudinal section through the a vacuum brake booster equipped with a modified embodiment of a sensor assembly according to the invention.
Figure 4:
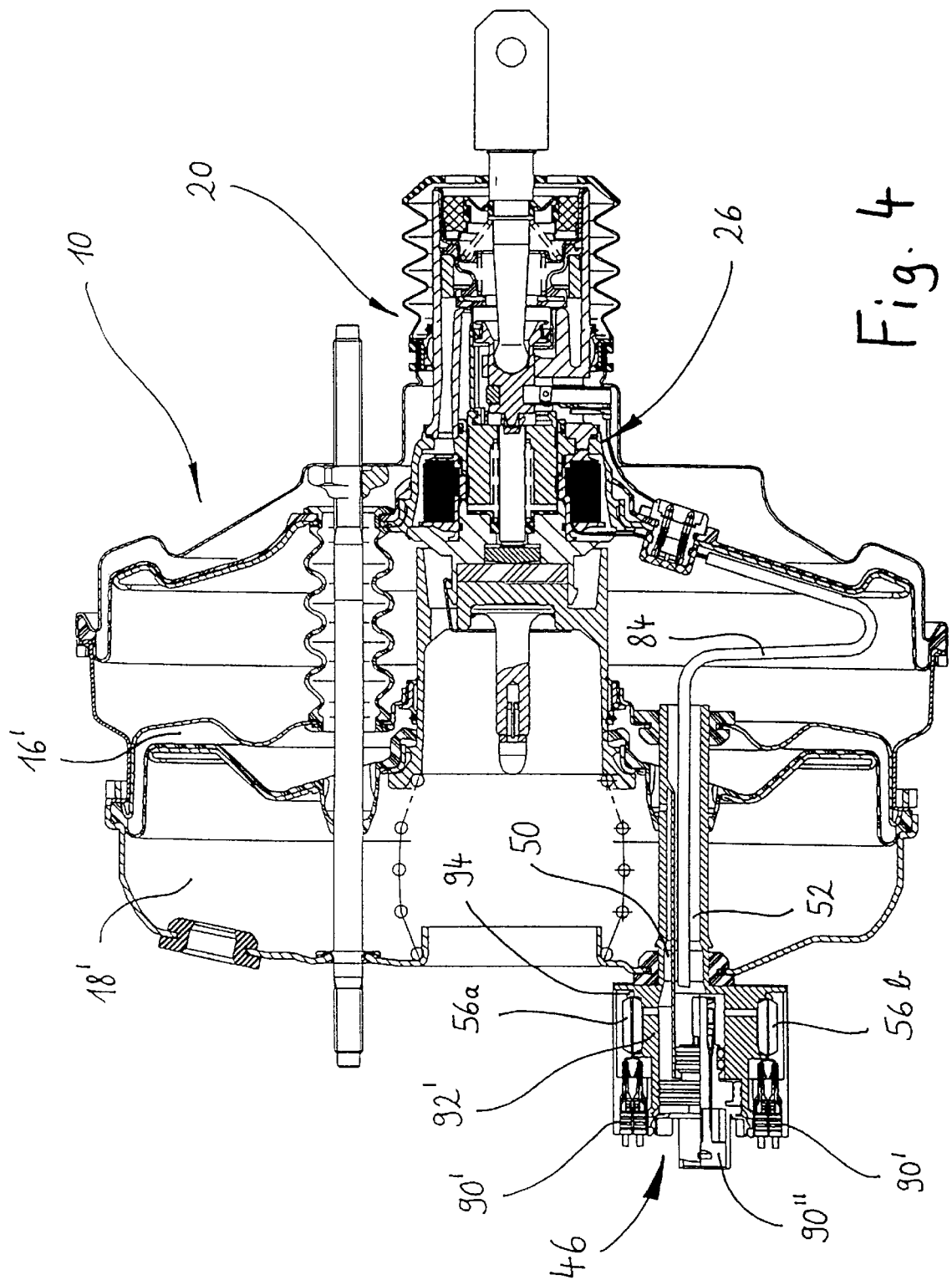
FIG. 4 shows a longitudinal section through an electromagnetically actuatable vacuum brake booster equipped with a still further modified embodiment of a sensor assembly according to the invention.

FIGS. 3 and 4 represent further embodiments of the sensor assembly 46, with FIG. 3 showing a second embodiment of a sensor assembly 46 installed in a tandem vacuum brake booster without electromagnetic actuation, and FIG. 4 showing a third embodiment of a sensor assembly 46 installed in a tandem vacuum brake booster with electromagnetic actuation.

The sensor assembly 46 illustrated in FIG. 3 has a system carrier 92 manufactured by a plastic injection molding method, which comprises the air duct 50, the second air duct 52 arranged within the latter, retaining arms 94 integrally formed with the system carrier 92, and a rear wall 96 of the housing 48 of the sensor assembly 46. The differential pressure sensor 56 is lockingly connected with the retaining arms 94 so that it is held positionally accurate and securely in the sensor assembly 46. Plug contacts 90' which are also attached at the system carrier 92 are electrically connected with the differential pressure sensor 56 in the sensor assembly 46 and serve to connect the sensor assembly 46 with an electronic controller not shown herein. A cap 98 which is attached to the rear wall 96 forms the second part of the housing 48 of the sensor assembly 46.

The third embodiment of a sensor assembly 46 shown in FIG. 4 differs from the second embodiment illustrated in FIG. 3 by a differently designed system carrier 92'. Similar to the second embodiment, the system carrier 92' comprises a second air duct 52 and a first air duct 50 arranged therein. The differential pressure sensor of the third embodiment, however, is divided into two pressure sensors 56a and 56b, the pressure sensor 56a being in fluid connection with the first air duct 50 and the pressure sensor 56b being in fluid connection with the second air duct 52. As in the second embodiment, the two pressure sensors 56a, 56b are in locking engagement with the system carrier 92' by means of retaining arms 94.

According to FIG. 4, the electrical connecting line 84 extends through the second air duct 52 to the electromagnetic actuation unit 26. This connecting line 84 terminates in the sensor assembly 46 in a plug 90" which is provided in addition to the two plug contacts 90'.

What is claimed is:

1. A vacuum brake booster with a housing which comprises at least one vacuum chamber and one working chamber which is separated therefrom by a movable wall and which is adapted to be optionally connected to vacuum or at least atmospheric pressure, and a sensor assembly comprising a differential pressure sensor, characterised in that the sensor assembly comprises:

a housing which is arranged outside the brake booster housing, in which the differential pressure sensor is arranged;

a first air duct connected to the differential pressure sensor, the length of which is sufficient to extend from the sensor assembly as far as into the working chamber of the brake booster; and a second air duct connected with the differential pressure sensor, the length of which is sufficient to extend from the sensor assembly as far as into the vacuum chamber of the brake booster, and in that the housing of the sensor assembly carries the first and second air ducts and is attached at the brake booster by means of the first and second air ducts.

2. The brake booster according to claim 1, characterised in that the first and second air ducts are rigid.

3. The brake booster according to claim 1, characterised in that the first and second air ducts are formed integrally with the housing.

4. The brake booster according to claim 1, characterised in that retaining arms for the differential pressure sensor are provided in the housing, the retaining arms being formed integrally with one of the housing and first and second air ducts.

5. The brake booster according to claim 1, characterised in that the first and second air ducts are arranged one inside one another.

6. The brake booster according to claim 5, characterised in that the first and second air ducts coaxially surrounds the other of the first and second air ducts.

7. The brake booster according to claim 1, characterised in that the first and second air ducts are adapted to be locked in the brake booster housing by means of a preferably circumferential locking projection.

8. The brake booster according to claim 1, characterised in that the first air duct is provided with radial openings in its end section facing the working chamber, which penetrate the duct wall for fluid connection of the working chamber with the first air duct.

9. The brake booster according to claim 1, characterised in that at least one of the first and second air ducts is dimensioned such that it can also accommodate connecting lines which lead from the sensor assembly to an electromagnetic actuation unit of the brake booster.

10. The brake booster according to claim 1, characterised in that a plug-type connector is provided for a pressure sensor, the pressure sensor being on the side of the sensor assembly, opposite the first and second air ducts.

11. The brake booster according to claim 1, characterised in that an electronic controller is arranged in the housing.

12. The brake booster according to claim 1, characterised in that the sensor assembly is attached at the brake booster by one of several locking projections which are formed circumferentially on the outer surface of at least one of the first and second air ducts or of the air ducts and which are sealingly locked with the brake booster housing behind rubber sleeves, which are fitted in passages for air ducts formed in the brake booster housing wall.

13. The brake booster according to claim 1, characterised in that the end section of the first air duct which is arranged in the working chamber comprises openings penetrating the duct wall, which provide a fluid connection between the working chamber and the first air duct, and that the first air duct is continued by an elastomeric bellows, the one end of which is sealingly attached at the free end of the first air duct and the other end of which is sealingly attached in the wall of the brake booster housing remote from and opposite to the sensor assembly.

14. The brake booster according to claim 10, characterised in that a pressure sensor having a V-shaped angled sensor housing is connected by means of the plug-type connector for a further sensor of the sensor assembly, which pressure sensor comprises, at the free end of the one leg of the V-shaped sensor housing, a connector corresponding to the plug-type connector of the sensor assembly and, at the free end of the other leg of the V-shaped sensor housing, a connector for the fluid connection with a master cylinder.

15. The brake booster according to claim 1, characterised in that the brake booster comprises an electromagnetic actuation unit which enables a leg-force independent actuation of the brake booster.

\* \* \* \* \*